(12) United States Patent
Passant

(10) Patent No.: US 6,879,873 B2
(45) Date of Patent: Apr. 12, 2005

(54) CNC GLASS CUTTING LINE WITH DYNAMIC CONTINUOUS PRODUCTION CONTROL SYSTEM

(75) Inventor: Johannes F. Passant, Natrona Heights, PA (US)

(73) Assignee: Billco Manufacturing Inc., Zelienople, PA (US)

( * ) Notice: Subject to any disclaimer, the term of this patent is extended or adjusted under 35 U.S.C. 154(b) by 169 days.

(21) Appl. No.: 10/410,877

(22) Filed: Apr. 10, 2003

(65) Prior Publication Data

US 2003/0226433 A1 Dec. 11, 2003

Related U.S. Application Data

(60) Provisional application No. 60/319,178, filed on Apr. 10, 2002.

(51) Int. Cl.[7] ............................................... G06F 19/00
(52) U.S. Cl. ...................... 700/171; 700/167; 700/101; 83/13; 83/75.5
(58) Field of Search ........................... 700/171, 95, 97, 700/100, 101, 103, 134, 167, 17.3, 223; 83/13, 75.5

(56) References Cited

U.S. PATENT DOCUMENTS

| | | | |
|---|---|---|---|
| 4,709,483 A | | 12/1987 | Hembree et al. |
| 5,341,306 A | * | 8/1994 | Fujita et al. ................. 700/171 |
| 5,757,647 A | * | 5/1998 | DeMichele ................... 700/95 |
| 5,832,801 A | | 11/1998 | Bando |
| 6,349,241 B1 | * | 2/2002 | Peron et al. ................. 700/134 |

OTHER PUBLICATIONS

Fenevision Production Control Brochure; © 2002–2003 Fenetech, Inc.: www.fenetech.com/products/prodctrl.htm.

* cited by examiner

*Primary Examiner*—Leo Picard
*Assistant Examiner*—Steven R. Garland
(74) *Attorney, Agent, or Firm*—Blynn Shideler; Krisanne Shideler; BLK Law Group

(57) ABSTRACT

A glass product cutting line includes a CNC cutting table, a sheet feeding device for feeding glass sheets to the glass cutting table, a plurality of harp racks, a sorting device and a dynamic cutting line control system. The control system optimizes the workpiece layout on the individual sheets with a biasing favoring individual workpieces assigned to a leading harp rack. The bias tends to cut workpieces of the leading harp rack on leading sheets fill the leading harp rack in a minimum time. The system allows for removal of a filled leading harp rack, by designating a new leading harp rack for the control system, which then dynamically adjusts the bias and associated cutting scheduling.

20 Claims, 3 Drawing Sheets

Schedule 335, run 203  14
Glass : Gyds 130x96
Yield : 92.7 (92.7)

| Label | Seq. | Order | Rack/Atrm | Hor. x Ver. | Shape |
|---|---|---|---|---|---|
| A 1.77 | 1 | 791800.001 | A 1.77 | 36 ¾ x 36 ⅞ | - |
| A 1.78 | 2 | 791800.001 | A 1.78 | 36 ¾ x 36 ⅞ | - |
| A 1.81 | 3 | 791800.001 | A 1.81 | 36 ¾ x 36 ⅞ | - |
| A 1.49 | 4 | 791800.001 | A 1.49 | 19 ⅜ x 71 15/16 | - |
| A 1.51 | 5 | 791800.001 | A 1.51 | 19 ⅜ x 71 15/16 | - |
| A 1.53 | 6 | 791800.001 | A 1.53 | 19 ⅜ x 71 15/16 | - |
| A 1.75 | 7 | 791800.001 | A 1.75 | 36 ¾ x 52 ⅝ | - |
| A 1.55 | 8 | 791800.001 | A 1.55 | 19 ⅜ x 71 15/16 | - |

Figure 2

CNC GLASS CUTTING LINE WITH DYNAMIC CONTINUOUS PRODUCTION CONTROL SYSTEM

CROSS REFERENCE TO RELATED APPLICATIONS

The present application claims the benefit of U.S. Provisional Patent Application Ser. No. 60/319,178, filed on Apr. 10, 2002 and entitled "CNC GLASS CUTTING LINE WITH DYNAMIC CONTINUOUS PRODUCTION CONTROL SYSTEM" which is incorporated herein by reference in its entirety.

BACKGROUND OF THE INVENTION

1. Field of the Invention

The present invention relates to CNC controlled machines with continuous production control. Specifically, the invention relates to a CNC controlled glass cutting line including a glass table with a dynamic, continuous production control system.

2. Background Information

Glass cutting lines, including glass cutting tables, are well-known in the art, such as those sold by the assignee of the present invention, Billco Manufacturing, Inc. The central piece of equipment in the glass cutting line is the glass cutting table, examples of which are described in U.S. Pat. Nos. 5,791,971 and 6,463,762 and pending patent application Ser. No. 09/277,534, which are incorporated herein by reference. The glass cutting table is designed to cut generally rectangular glass sheets into a plurality of individual glass workpieces for subsequent manufacturing. The typical glass cutting line will also include a sheet feeding device upstream of the glass cutting table for feeding the glass sheets to be cut to the glass cutting table. The sheet feeding device may be in the form of an air float table to which individual glass sheets to be cut are fed, such as from a storage rack, and then aligned prior to forwarding to the glass cutting table. The typical glass cutting line will also include a sorting device downstream of the glass cutting table where the cut glass sheets are individually sorted by the specific glass workpieces into storage racks, generally called harp racks. A harp rack is provided with a number of slots, such as 100, for receiving the individual cut glass workpieces. The sorting device may be formed as an air float table with a plurality of adjacent harp racks.

Existing glass cutting lines typically utilize a production control system designed to minimize scrap. Currently, a specific cutting schedule for a production run, or single batch, is prepared in advance by the control system. The production run essentially corresponds to the number of harp racks and associated slots at the sorting station. Basically, existing optimization programs are used to determine the optimal cutting schedule for filling the slots of the harp racks with the desired glass workpieces. The cutting schedule essentially refers to the collection of layouts of the individual glass workpieces on all the glass sheets to be cut for the production run or batch. Following the production run, the filled harp racks can be moved to the next location in the manufacturing process. It is important to note that different harp racks may go to different assembly lines and, therefore, may have widely different product mixes, i.e., a different set of individual glass workpieces filling the different harp racks. At the end of the production run is the last sheet, which generally has the lowest yield (i.e., the highest scrap) because the glass workpieces formed from this "last sheet" do not fill up the sheet. Additionally, some control systems allow for recuts to be added to the last sheet to help minimize the yield loss of the entire production cycle. Recuts are duplicate workpieces to replace previous cut workpieces that may have been damaged, broken or otherwise unusable.

The existing systems are limited by several problems. First, each system is limited by the number of available slots in the available harp racks. In general, the greater the number of slots the greater the yield since the optimizing program will have a greater number of pieces to select from to maximize product yield. Second, the harp racks generally cannot be moved until the entire production run is completed, including the recuts at the end of the batch process. Third, the existing last sheet problem increases yield loss, even with recuts incorporated into the last sheet. Additionally, the existing system does not easily accommodate special pieces not accounted for in the production run. It is one object of the present invention to overcome these problems of the prior art optimization systems and provide an efficient, effective glass cutting line with dynamic production control.

SUMMARY OF THE INVENTION

The above problems with the prior art are addressed with a glass product cutting line having a CNC cutting table, a sheet feeding device, a plurality of harp racks, a sorting device and a dynamic cutting line control system according to the present invention. The CNC or computer controlled glass cutting table is for cutting sheets of glass into cut glass workpieces. The feeding device is for feeding glass sheets to the glass cutting table and the sorting device is for sorting the cut glass workpieces and moving the cut glass workpieces to the associated harp rack. Each harp rack will generally have a plurality of slots receiving the cut glass workpieces. The dynamic cutting line control system includes an optimizer coupled to the controller of the glass cutting table optimizing the glass workpiece layout on the individual sheets of glass. The optimizer includes a dynamically adjustable bias or biasing feature for favoring individual cut glass workpieces assigned to a leading harp rack, whereby the bias will tend to position and cut the glass workpieces assigned to the leading harp rack on leading sheets to completely fill the leading harp rack in a minimum time. The control system further accommodates removal of a filled leading harp rack from the glass cutting line. This is aspect of the control system is collectively called a rack removal accommodator with the accommodator designating a new leading harp rack for the optimizer, which then dynamically adjusts the bias and associated cutting scheduling.

The accommodator of the control system may introduce a new empty harp rack to replace the previous filled leading harp rack that has been removed. The control system may further include an input mechanism for inputting additional glass workpieces to be cut into the optimizer. The input mechanism may accommodate recuts of previously cut glass workpieces. The recuts inputted may include a designation of the desired harp rack. The input mechanism may accommodate special glass workpieces that are not assigned to a given harp rack. The special workpieces may be provided with a bias by the optimizer higher than the bias for the workpieces assigned to the leading harp rack. A rare harp rack with minimal slots may also be provided for assigning and holding workpieces that very uncommon (i.e. rare).

The bias is generally in the form of an adjustable weighting factor for each harp rack, wherein the biasing or weighting factor is the greatest for the leading harp rack and wherein the biasing factor for each harp rack is increased as the harp rack is closer to being filled. However the bias may be any function or method of making the workpieces for the leading harp rack more likely to be completed before the remaining workpieces, without, of course, an absolute requirement for the leading rack to be completed first.

The apparatus of the present invention provides a method of dynamically controlling a glass product cutting line having a computer controlled glass cutting table cutting sheets of glass into cut glass workpieces and a plurality of cut glass workpiece holding harp racks. The method comprising the steps of optimizing the glass workpiece layout on the individual sheets of glass, wherein the optimizing includes a biasing for favoring individual cut glass workpieces assigned to a leading harp rack, whereby the biasing will tend position and cut the glass workpieces assigned to the leading harp rack on leading sheets to completely fill the leading harp rack in a minimum time; removing a leading harp rack from the glass cutting line when filled; and designating a new leading harp rack for the cutting table for dynamically adjusting the bias and subsequent cutting scheduling. The method may further include the steps of adding a new empty harp rack to replace the previous filled leading harp rack that has been removed, and imputing additional glass workpieces to be cut. The inputting may accommodate recuts of previously cut glass workpieces, wherein the recuts include a designation of the desired harp rack. The inputting may further accommodate special glass workpieces that are not assigned to a given holding rack or assigned to a rare holding rack. The special workpieces may be provided with a bias higher than the bias for the workpieces assigned to the leading harp rack.

These and other advantages of the present invention will be clarified in the description of the preferred embodiment taken together with the attached figures wherein like reference numerals represent like elements throughout.

BRIEF DESCRIPTION OF THE DRAWINGS

FIG. 2 is a schematic view of an input screen for the production control system of the present invention illustrating a proposed sheet layout;

DETAILED DESCRIPTION OF THE PREFERRED EMBODIMENT

Figure 1:
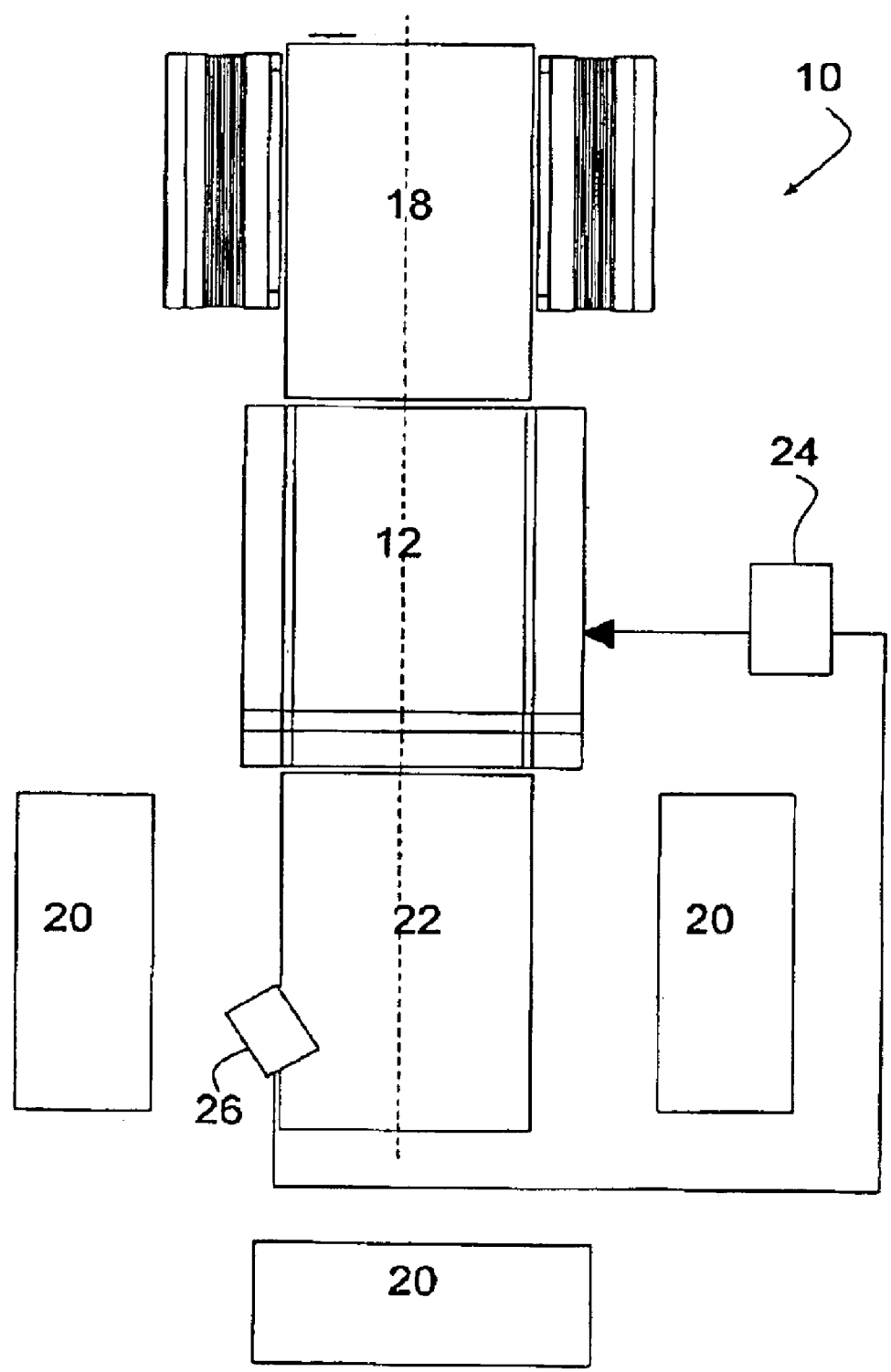
FIG. 1 is a schematic plan view of a glass cutting line using a dynamic continuous production control system according to the present invention.

FIG. 1 schematically illustrates a glass product cutting line 10 according to the present invention. The central component of the cutting line 10 is a computer controlled CNC glass cutting table 12 for cutting sheets of glass 14 into cut glass workpieces 16. The cutting table 12 is well known in the art such as those sold by Billco Manufacturing, Inc. The table 12 generally includes a cutting or scoring head mounted on a carriage which, in turn, is mounted on a bridge over the table surface. The carriage and bridge from an X–Y positioning system for the cutting head.

A feeding device 18 is provided upstream of the table 12 for feeding glass sheets 14 to the glass cutting table 12. The feeding device 18 may include an air float table, such as manufactured by Billco Manufacturing Inc. Additionally, the feeding device 18 may include an alignment mechanism for properly positioning the glass sheets 14 on the table 12. The feeding device 18 may include manual input for loading and positioning the sheets 14 on the cutting table 12 or the feeding may be automated. A plurality of moveable, cut glass workpiece 16 holding, harp racks 20 are positioned downstream of the table 12, with each harp rack 20 having a plurality of slots receiving the cut glass workpieces 16.

A sorting device 22 is downstream of the table 12 for sorting the cut glass workpieces 16 and moving the cut glass workpieces 16 to the associated harp rack 20. The harp racks 20 are positioned adjacent the sorting device 22. The sorting device 22 may include an air float table similar to the feeding device 18. As with the feeding device 18, the sorting device 22 may utilize manual input for loading and positioning the workpieces 16 from the float table to the designated slots of the harp rack 20 or the loading may be automated.

The key feature of the cutting line 10 of the present invention is a dynamic cutting line control system 24 including an optimizer coupled to the controller of the glass cutting table 12. The optimizer will optimize the layout of the glass workpieces 16 on the individual sheets of glass 14. A representative example of this optimization is illustrated in the schematic layout for "Sheet 1" on the touch screen input device display shown in FIG. 2. The general operation of an optimizer is believed to be known to those in the art. The most significant feature of the present invention is the inclusion of an adjustable weighting or biasing for favoring individual cut glass workpieces 16 assigned to a leading harp rack 20, whereby the bias will tend to position and cut the glass workpieces 16 assigned to the leading harp rack 20 on leading sheets 14 to completely fill the leading harp rack 20 in a minimum time.

The optimizer of the present invention will still take into account all of the slots currently available in all of the harp racks 20 in optimizing the layout of the incoming sheet 14. The optimizer simply weights, or favors, the workpieces 16 for the leading harp rack 20 to a greater extent. The weighting results in a filling of the leading harp rack 20 first, allowing the filled harp rack 20 to be removed from the cutting line 10 and sent for subsequent processing. It will be understood that the bias will change the layout that may otherwise be generated for the given sheet 14 and this might actually be a lower yield arrangement. However it is expected that this loss will be offset and the total yield loss may actually decrease by the avoidance of a last sheet, as will be described below. The improvement is the ability to move the filled rack 20 (the leading rack) to subsequent processing to avoid delays in subsequent processing. Essentially the cutting line 10 is no longer a batch process, but a dynamic, continuous process. The biasing or weighting described for the present invention can be accomplished in any number of ways as will be appreciated by those in the art. For examples, negative weights may be added to the workpieces 16 assigned to the non-leading racks 20, effectively positively weighting the workpieces 16 assigned to the leading rack 20. The bias within the meaning of the present invention will be any system or method which makes it more likely that the workpieces 16 assigned to the leading racks 20 are processed or cut first. It is not expected that the cutting of the workpieces 16 assigned to the leading rack 20 be an absolute requirement.

The removal of a filled leading harp rack 20 from the glass cutting line 10 allows the control system 24 to designate a new leading harp rack 20 for the optimizer which dynamically adjusts the bias and associated cutting scheduling. This feature of the control system 24 is collectively called a harp rack removal accommodator. The accommodator will reprioritize the remaining harp racks 20 and allow for the inclusion of a new harp rack 20 replacing the filled harp rack 20 that was removed. The reprioritization is simply assigning, or reassigning, a weighting or bias value to the specific harp racks. The next harp rack 20 to be removed will be the new leading harp rack 20 and will generally have the highest biasing or weighting factor. The bias referred can be associated with the harp racks 20 to which the workpieces 16 are assigned or can alternatively be considered to be associated directly with the workpieces 16.

The adding of replacement harp racks 20 is another key feature of the present invention which will advantageously affect total yield. This feature allows the cutting line to operate with any number of harp racks 20 regardless of the number of harp racks 20 that may be located around the sorting device 22. As a simplistic illustrative example consider the cutting line 10 forming four separate product mixes for specific harp racks 20, referred to as rack mix A, B, C, and D respectively. It will be obvious that the traditional batch process of the prior art will require at least two separate production runs to be planned. Further complicating the matter may be that the racks may not be equally needed in subsequent processing lines (e.g. consider a distribution of 50% A, 30% B, 15% C and 5% D). This would further increase the number of separate batch runs (each with a separate last sheet) needed to accommodate the desired production with the prior art. The present cutting line 10 easily accommodated the product mixes by continuously adding harp racks 20 to the queue. The cutting line 10 thereby accommodated a greater number of harp rack types than can fit around the sorting device 22 and also easily accommodates a varying percentage of the distinct harp racks 20.

The present control system 24 relies on the ability of the optimizer to dynamically optimize subsequent sheets in a manner similar to the existing optimizing of last sheets with added recuts. The difference is the optimization of each sheet 14 individually taking into account all of the available slots in the harp racks 20 currently adjacent the sorting device 22 and taking into account the bias for the leading harp rack 20. The bias for the leading harp rack 20 may be adjustable by the operator allowing for the operator to balance the overall yield obtained with the desire to decrease the time in filling the leading harp rack 20. A further feature of the present invention is that the bias or weighting factor used for each harp rack 20 or each piece 16 may also change as the harp rack 20 is closer to being filled. In other words the relative weighting factors for each harp rack 20 may also change as the harp rack 20 is filling up with workpieces 16 with the bias increasing as the harp rack 20 is closer to being filled. This relative increase or weighting in favor of almost filled harp racks 20 may be adjustable by the user so the operator can adjust the weighting increase and overall weighting values to balance yield and harp rack 20 filling rates.

The current system is continuous, or at least a semi-batch process, and avoids the last sheet problem of the prior art. Further the control system 24 avoids much of the problem with recuts. When a recut is desired, the operator can simply input the desired recut and it will be automatically entered into the product mix with the desired weighting associated. For example if the leading harp rack 20 is almost filled and a recut is needed to complete the harp rack, the operator inputs the desired recut and the above described weighting procedure would prioritize this workpiece 16. The leading harp rack 20 will be completed without waiting till the end of a production run as in the prior art. The input may be through an input device such as a touch screen 26 illustrated in FIG. 2. The operator merely touches on the image of the desired workpiece 16 illustrated on the appropriate sheet 14 and a new screen allowing the entry of a recut request is shown to the operator. The system also accommodates special pieces not in the original product mix (e.g. products not normally produced on this cutting line). The special pieces may not be associated with any harp rack and would likely be given the highest weighting. Alternatively a rare rack 20 with minimal slots may be positioned adjacent the sorting device 22 to accommodate and hold rare workpieces 16 such as a special piece. The weighting of workpieces 16 assigned to such a rare rack 20 can be left to the operator. It is important to note that the highest weighting will not guarantee the subject piece is cut on the next sheet 14, it simply makes it more likely. In other words even with the priority weighting, workpieces from non-leading harp racks 20 may be determined to be optimal.

Figure 3:
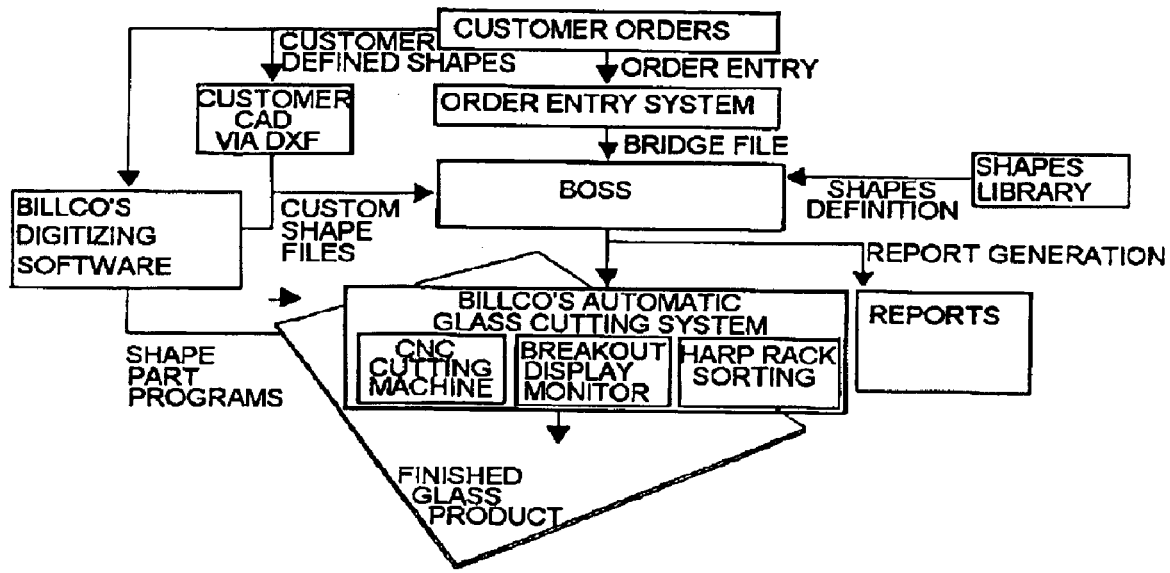
FIG. 3 is a schematic flow chart of an automated glass cutting process incorporating the dynamic continuous production control system according to the present invention.
Figure 4:
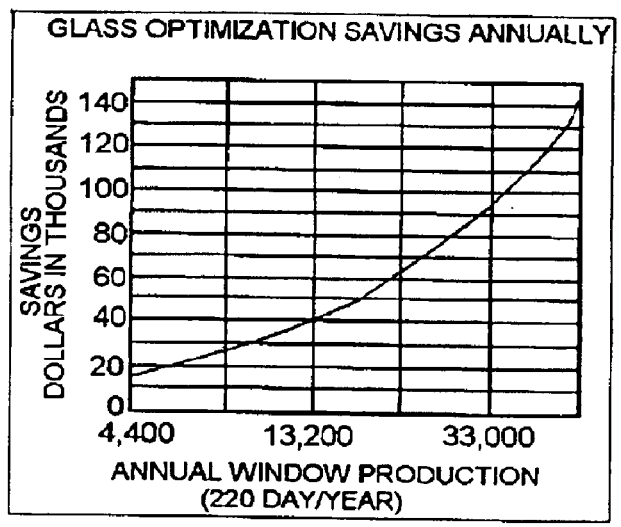
FIG. 4 is a graph illustrating a representative example of annual savings through implementation of the dynamic continuous production control system according to the present invention.

Regarding the use of the present invention, FIG. 3 is a schematic flow chart of an automated glass cutting process incorporating the dynamic continuous production control system according to the present invention as described above. The use of the present invention can provide significant improves savings over prior art systems. FIG. 4 is a graph illustrating a representative example of annual savings through implementation of the dynamic continuous production control system according to the present invention.

The control system of the present invention may be retrofitted to operate on cutting lines of the prior art. The other advantage of the present invention will be apparent to those in the art. The invention has been described with reference to the preferred embodiment. Obvious modifications and alterations will occur to others upon reading and understanding the proceeding detailed description. It is intended that the invention be construed as including all such modifications and alterations. The scope and content of the present invention is defined by the appended claims and equivalents thereto.

What is claimed is:

1. A dynamic product cutting line control system for a cutting line having a plurality of cut workpiece holding racks, in which cutting line sheet product is cut into individual workpieces that are moved to the holding racks, the control system comprising:

an optimizer coupled to the cutter of the cutting line optimizing the workpiece layout on the individual sheet product, wherein the optimizer includes a biasing for favoring individual workpieces assigned to a leading holding rack, whereby the bias will tend to position and cut the workpieces assigned to the leading holding rack on leading sheets to completely fill the leading holding rack in a minimum time; and a rack removal accommodator coupled to the optimizer, wherein a leading holding rack is removed from the cutting line and the accommodator designates a new leading holding rack for the optimizer.

2. The control system of claim 1, wherein the accommodator will introduce a new empty holding rack to replace the previous leading rack that has been removed when filled.

3. The control system of claim 2, further including an input mechanism for inputting additional workpieces to be cut into the optimizer.

4. The control system of claim 3, wherein input mechanism accommodates recuts of previously cut workpieces, wherein the recuts include a designation of a desired holding rack.

5. The control system of claim 4, wherein the input mechanism accommodates special workpieces that are not assigned to a given holding rack.

6. The control system of claim 5, wherein the bias is in the form of a weighting factor for each holding rack, wherein the biasing factor is the greatest for the leading holding rack.

7. The control system of claim 1, wherein the bias is in the form of a weighting factor for each holding rack, wherein the biasing factor for each holding rack is increased as the holding rack is closer to being filled.

8. A dynamic glass product cutting line control system for a glass cutting line having a computer controlled glass cutting table cutting sheets of glass into cut glass workpieces and a plurality of cut glass workpieces holding harp racks, the control system comprising:

an optimizer coupled to a controller of the glass cutting table optimizing the glass workpiece layout on an individual sheet of glass, wherein the optimizer includes a biasing for favoring individual cut glass workpieces assigned to a leading harp rack, whereby the bias will tend to position and cut the glass workpieces assigned to the leading harp rack on leading sheets to completely fill the leading harp rack in a minimum time; and a harp rack removal accommodator coupled to the optimizer, wherein a leading harp rack is removed from the glass cutting line and the accommodator designates a new leading harp rack for the optimizer which dynamically adjusts the bias and associated cutting scheduling.

9. The control system of claim 8, wherein the accommodator will introduce a new empty harp rack to replace the previous leading harp rack that has been removed when filled.

10. The control system of claim 9, further including an input mechanism for inputting additional glass workpieces to be cut into the optimizer.

11. The control system of claim 10, wherein input mechanism accommodates recuts of previously cut glass workpieces, wherein the recuts include a designation of a desired harp rack.

12. The control system of claim 11, wherein the input mechanism accommodates special glass workpieces that are not assigned to a given holding rack, wherein the special workpieces are provided with a bias by the optimizer higher than the bias for the workpieces assigned to the leading harp rack.

13. The control system of claim 12, wherein the bias is in the form of a weighting factor for each harp rack, wherein the biasing factor is the greatest for the leading harp rack.

14. The control system of claim 8, wherein the bias is in the form of a weighting factor for each harp rack, wherein the biasing factor for each harp rack is increased as the harp rack is closer to being filled.

15. A glass product cutting line comprising:

a computer controlled glass cutting table for cutting sheets of glass into cut glass workpieces;

a feeding device for feeding glass sheets to the glass cutting table;

a plurality of moveable cut glass workpiece holding harp racks, each harp rack having a plurality of slots receiving the cut glass workpieces;

a sorting device for sorting the cut glass workpieces and moving the cut glass workpieces to an associated harp rack; and a dynamic cutting line control system including an optimizer coupled to a controller of the glass cutting table optimizing the glass workpiece layout on the individual sheets of glass, wherein the optimizer includes a biasing for favoring individual cut glass workpieces assigned to a leading harp rack, whereby the bias will tend to position and cut the glass workpieces assigned to the leading harp rack on leading sheets to completely fill the leading harp rack in a minimum time, and a harp rack removal accommodator coupled to the optimizer, wherein a leading harp rack is removed from the glass cutting line and the accommodator designates a new leading harp rack for the optimizer which dynamically adjusts the bias and associated cutting scheduling.

16. The cutting line of claim 15, wherein the accommodator will introduce a new empty harp rack to replace the previous leading harp rack that has been removed when filled, and further including an input mechanism for inputting additional glass workpieces to be cut into the optimizer, wherein the input mechanism accommodates recuts of previously cut glass workpieces, and wherein the recuts include a designation of a desired harp rack, and wherein the input mechanism accommodates special glass workpieces that are not assigned to a given holding rack, and wherein the special workpieces are provided with a bias by the optimizer higher than the bias for the workpieces assigned to the leading harp rack.

17. The cutting line of claim 16, wherein the bias is in the form of a weighting factor for each harp rack, wherein the biasing factor is the greatest for the leading harp rack, and wherein the biasing factor for each harp rack is increased as the harp rack is closer to being filled.

18. The cutting line of claim 15, wherein the feeding device and the sorting device each include an air float table.

19. A method of dynamically controlling a glass product cutting line having a computer controlled glass cutting table cutting sheets of glass into cut glass workpieces and a plurality of cut glass workpiece holding harp racks, each harp rack having a plurality of slots receiving the cut glass workpieces, the method comprising the steps of:

optimizing the glass workpiece layout on the individual sheets of glass, wherein the optimizing includes a biasing for favoring individual cut glass workpieces assigned to a leading harp rack, whereby the biasing will tend to position and cut the glass workpieces assigned to the leading harp rack on leading sheets to completely fill the leading harp rack in a minimum time;

removing a leading harp rack from the glass cutting line when filled; and designating a new leading harp rack for the cutting table for dynamically adjusting the bias and subsequent cutting scheduling.

20. The method of claim 19, further including the steps of adding a new empty harp rack to replace the previous leading harp rack that has been removed when filled, and inputting additional glass workpieces to be cut, wherein the inputting accommodates recuts of previously cut glass workpieces, and wherein the recuts include a designation of a desired harp rack, and wherein the inputting further accommodates special glass workpieces that are not assigned to a given holding rack, and wherein the special workpieces are provided with a bias higher than the bias for the workpieces assigned to the leading harp rack.

* * * * *